United States Patent

[11] 3,629,046

[72] Inventor William B. Gilbert
32511 Scottsdale, Franklin, Mich. 48024
[21] Appl. No. 886,814
[22] Filed Dec. 22, 1969
[45] Patented Dec. 21, 1971

[54] FOAMED PLASTIC CORE DOOR
5 Claims, 4 Drawing Figs.

[52] U.S. Cl...................................................... 161/43,
161/161, 161/220
[51] Int. Cl........................................................ B32b 3/28,
B32b 3/26
[50] Field of Search........................................... 161/43,
161, 270, 160, 139, 133, 135, 137, 220, 217, 218,
251; 49/507; 52/455; 156/87, 90

[56] References Cited
UNITED STATES PATENTS
2,924,861  2/1960  Viets .............................  161/161 X
2,972,559  2/1961  Allen et al. ....................  161/161 X
3,062,698  11/1962  Aykanian .....................  156/306
3,168,763  2/1965  Gilbert .........................  161/38
3,325,431  6/1967  McManus .....................  161/133 X OTHER REFERENCES
" Styrofoam," The Dow Chemical Co., Plastics Dept., 1951, pages 15 and 16

Primary Examiner—Harold Ansher
Assistant Examiner—Joseph C. Gil
Attorney—Barnard, McGlynn & Reising ABSTRACT: A door having a rectangular wooden frame and a core consisting of a slab of foamed polystyrene sandwiched thick between two sheets of corregated cardboard. The uncompressed thickness of the core is greater than that of the frame and a pair of facing sheets of aluminum having dimensions similar to the frame are retained to the outer surfaces of the corregated board with a water-soluble glue and to compress the core to the same thickness as the frame.

PATENTED DEC 21 1971  3,629,046

INVENTOR.
William B. Gilbert
BY
Barnard, McGlynn & Reising
ATTORNEYS

FOAMED PLASTIC CORE DOOR

BACKGROUND OF THE INVENTION

This invention relates to doors formed with rectangular wooden frames, and solid cores, faced on both sides with sheet material.

PRIOR ART

My U.S. Pat. No. 3 168 763 discloses a solid core door wherein a core or "slug" formed of a plurality of elongated wooden blocks is sandwiched between a pair of compressible corregated cardboard sheets. This slug is disposed within a rectangular wooden frame which has dimensions complimentary to the slug. The frame thickness is slightly less than the uncompressed thickness of the slug and a pair of facing sheets of plywood, cardboard or the like are pressed into contact with the frame and adhered to the frame and the outer surfaces of the corregated board. In the process the slug is compressed. The cardboard sheets act to prevent imperfections and discontinuities in the slug from "telegraphing" through the outer surfacing sheets and impairing the appearance of the door.

It has heretofore been proposed to employ foamed plastics such as polystyrene as cores for the doors because of their excellent sound and thermal insulating properties and relatively low cost. Such foams are quite resilient and no problem exists as to the defects in the core affecting the appearance of the door. On the negative side, such foam plastics are impervious to moisture creating a problem when fluid impervious facing sheets, such as metal- or plastic-impregnated plywood is employed in the door. The interior sides of the facing sheets must be adhered to the outer surfaces of the core but if both are fluid impervious it is not possible to use water soluble adhesives. Efforts have been made to produce such doors using solvent-based contact adhesives but these present great problems in production because their vapors are explosive and so poisonous that they can only be applied in a carefully ventilated and explosionproofed area.

SUMMARY OF THE PRESENT INVENTION

The present invention contemplates a door having a foamed plastic core sandwiched between fluid-impervious facing sheets without sacrificing the advantages accrueing to the use of water-soluable adhesives. The marriage between these apparently incompatible materials is achieved by the use of corregated cardboard buffer sheets between the outer facing sheets and the plastic core. The buffer sheets absorb the moisture in the adhesive so that the water-base adhesive may be used with all of its attendant advantages. While the resultant structure falls within the broad teachings of my previous patent, its development was not the result of the obvious application of the teachings of that patent to the novel materials employed, but rather required extensive experimentation before the present structure was defined.

In the present structure, as in the door of my previous patent, the slug consisting of a foamed plastic core and two corregated board facing sheets is made to have an uncompressed thickness which is slightly greater than that of the frame members employed so that positive contact between the core and the facing sheets is insured when the door is joined together in an appropriate press.

Other objects, advantages and applications of the present invention will be made apparent by the following detailed description of a preferred embodiment.

The description makes reference to the accompanying drawings in which.

Figure 1:
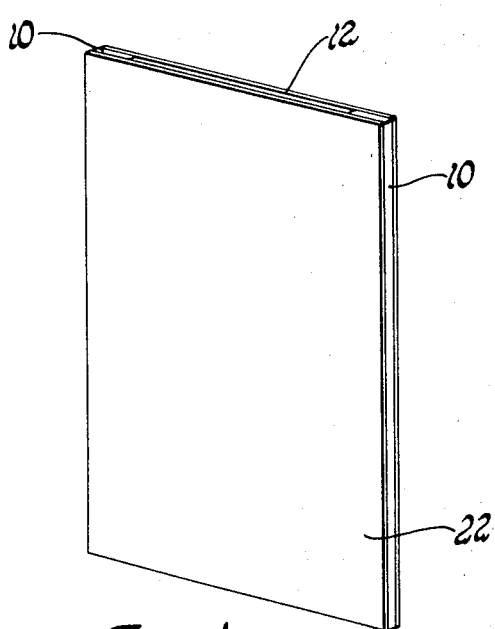
FIG. 1 is a perspective view of a door formed in accordance with the present invention.
Figure 2:
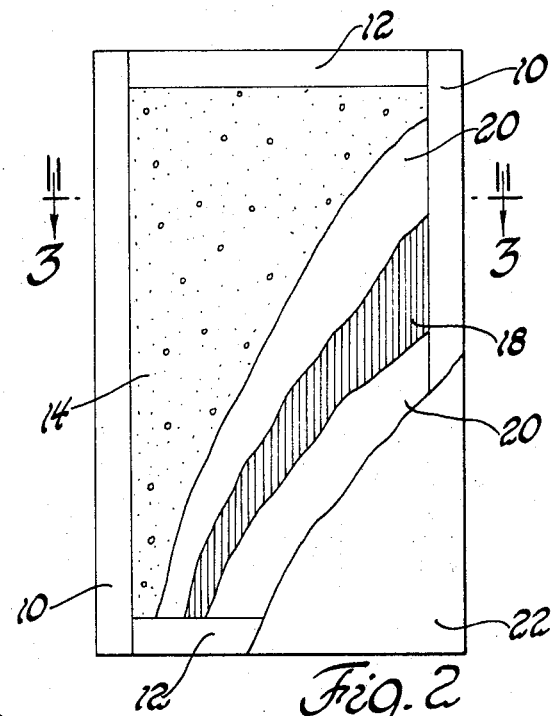
FIG. 2 is an elevation view, broken away, to disclose the method of construction of the door.
Figure 3:
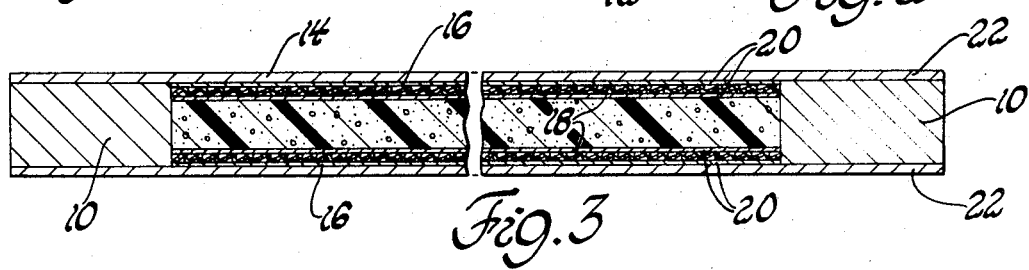
FIG. 3 is a cross section view taken along line 3—3 of FIG. 2.

A door constituting a preferred embodiment of the present invention employs a rectangular wooden outer frame formed of the pair of stiles 10 which are disposed parallel to one another and are aligned in a vertical manner when the door is in use, and a pair of shorter rails 12 which extend normally between the stiles at their extreme ends. Both the stiles and rails are formed of lumber which may typically be 1½-inches thick and 3-inches wide. The stiles and rails may be joined together in any suitable manner such as with adhesives, nails or staples.

The core employed with a preferred embodiment of the invention is built about a slab 14 of expanded polystyrene which may preferably have a density of approximately 2 pounds per cubic foot. The polystyrene slab 14 employed in the preferred embodiment is of the type formed by heating beads of polystyrene which are impregnated with hydrocarbons. The core slab 14 could alternatively be formed of other foamed plastics such as polyurethane or polyethylene.

The slab 14 has exterior dimensions complimentary to those of the frame formed by the stiles 10 and the rails 12 so that it fits within the aperture formed by these frame members. The slab has a thickness of slightly less than that of the frame members. For example, with a frame thickness of 1½ inches the slug may have a thickness of 1⅜ einches The foam slab 14 is sandwiched between a pair of corregated cardboard sections 16. The corregated sections have edge dimensions identical to the core and each has one surface adhered to a face of the core by any suitable adhesive such as a casein glue. The cardboard sheets 16 are the normal variety having a corregated section 18 sandwiched between two plain sections 20.

The corregated boards 16 preferably has an uncompressed thickness of approximately one-quarter inch. Accordingly, the core formed by the slab 14 and the two corregated sections 16 has a total uncompressed thickness of 1⅝ inches, which is slightly greater than 1½-inch thickness of the frame members 10 and 12.

The door assembly is completed by a pair of facing sheets 22, preferably formed of thin aluminum having outer dimensions similar to those of the frame formed by the stiles 10 and the rails 12. The facing sheets may have a simulated wood finish on their outer side which may be applied in any suitable manner as by painting or laminating printed sheet thereto. In alternate embodiments of the invention the aluminum sheet might be replaced by plastic-impregnated wood, or cardboard. From the standpoint of the present invention of the significant feature of the cover sheets 22 is that they are substantially impervious to moisture.

Figure 4:
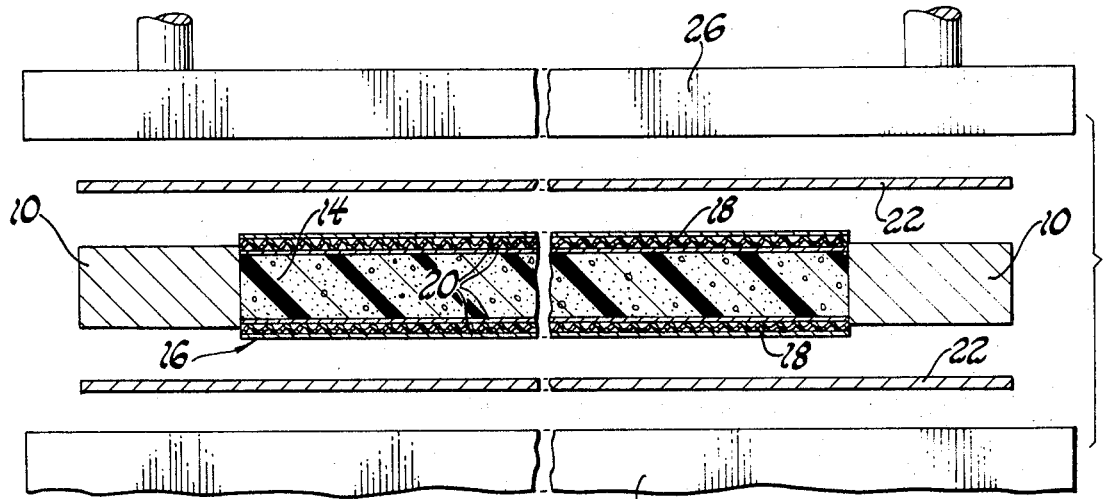
FIG. 4 is a cross section view of the components of an unfinished door disclosing a method of assembling the components.

The outer sheets 22 are applied to the assembly of the core and frame by coating the surface of the core with a suitable water-soluble adhesive. In the preferred embodiment of the invention a synthetic latex emulsion contact adhesive such as that sold by the Borden Company and designated EN-743 may be employed. The opposed surfaces are both coated with the adhesive and while the adhesive is still in a viscuous fluid state the sheets 22 are pressed against the frame and core as in a press schematically illustrated by the platen members 26 and 28 in FIG. 4.

The press members 26 and 28 force the interior surfaces of the panels 22 against the outer surfaces of the stiles 10 and the rails 12 producing a compression of the cardboard sheet 16. This compression insures a firm bond between the cardboard sheets and the facing sheets 22. Because the contact adhesive is still in a somewhat fluid state, minor positional adjustments may be made between the sheets 22 and the core and frame assembly.

The cardboard sheets 16 act to absorb the moisture in the adhesive so that a firm set of the adhesive is achieved. In the absence of the cardboard sections it would be impossible to employ a fluid-soluble adhesive. The stiles and rails are, of course, somewhat fluid pervious, and act to absorb the moisture from the adhesive abutting their surfaces to set the adhesive in those areas.

When the adhesive is set and the press is released the finished door section as shown in FIG. 1 is obtained.

The embodiments of the invention which an exclusive property or privilege is claimed are defined as follows:

1. A door comprising: a rectangular outer frame; a core having outer dimensions complimentary to the inner dimensions of the frame disposed within said frame, said core including a planar rectangular inner member formed of a foamed plastic, and a pair of compressible sheets of a water-absorbant material adhered to the faces of the inner member; and a pair of outer panels formed of sheets of water impervious material having outer dimensions similar to the frame fixed to the faces of the frame and the core with a water-soluble adhesive, said compressible sheets being operative to absorb the water in said adhesive so as to allow the adhesive to set.

2. The door of claim 1 in which the foamed plastic inner member has a thickness less than that of the frame, and the pair of compressible sheets have uncompressed thicknesses sufficient to bring the total thickness of the core to a dimension which exceeds the thickness of the frame, and the pair of outer panels abut the faces of the frame so as to compress the core.

3. The structure of claim 1 wherein the planar rectangular inner member is formed of foamed polystyrene and the compressible sheets are cardboard.

4. A door panel, including; a rectangular frame formed of a pair of elongated lumber stiles joined at their extreme ends by a pair of shorter lumber rails, the stiles and rails having a uniform thickness; a slug having outer dimensions which are complimentary to the inner dimensions of the frame disposed within the frame, said slug being composed of a rectangular inner member formed of foamed plastic and a pair of water-absorbant corrugated rectangular cardboard sheets of the same outer dimensions as the inner member laminated to the opposed faces thereof, the slug having uncompressed thickness greater than the thickness of the frame; and a pair of water-impervious sheet outer panels having outer dimensions similar to the frame adhered to the two faces of the frame and slug in abutting relationship to the frame surfaces so as to compress the cardboard by a water-soluble adhesive, whereby the corrugated cardboard sheets absorb water from the adhesive to achieve setting thereof.

5. The door panel of claim 4 wherein the foamed plastic inner member is formed of polystyrene which is water impervious and the pair of outer panels are formed of sheet metal.

* * * * *